United States Patent
Brancheriau et al.

(10) Patent No.: US 8,951,102 B2
(45) Date of Patent: Feb. 10, 2015

(54) VENTILATION MEANS WITH ORIENTATION AND FLOW RATE ADJUSTMENT OBTAINED BY ROTATING A PROFILED BODY

(75) Inventors: Christian Brancheriau, Herblay (FR); Pierre Guerreiro, Saint Gratien (FR); Guy Heriquet, Saint Gratien (FR); Etienne Francois, Méru (FR); Lionel Fernandes, Paris (FR)

(73) Assignee: Faurecia Interieur Industrie, Nanterre (FR)

( * ) Notice: Subject to any disclaimer, the term of this patent is extended or adjusted under 35 U.S.C. 154(b) by 1527 days.

(21) Appl. No.: 11/920,731

(22) PCT Filed: May 24, 2006

(86) PCT No.: PCT/FR2006/001187
§ 371 (c)(1),
(2), (4) Date: Nov. 20, 2007

(87) PCT Pub. No.: WO2006/125915
PCT Pub. Date: Nov. 30, 2006

(65) Prior Publication Data
US 2009/0047892 A1  Feb. 19, 2009

(30) Foreign Application Priority Data

May 26, 2005 (FR) .................................... 05 05321
May 26, 2005 (FR) .................................... 05 05322
May 26, 2005 (FR) .................................... 05 05323

(51) Int. Cl.
*B60H 1/34* (2006.01)
*F24F 13/065* (2006.01)

(52) U.S. Cl.
CPC ............ *F24F 13/065* (2013.01); *B60H 1/3442* (2013.01)

USPC ........................................................ 454/155

(58) Field of Classification Search
USPC ......... 454/152, 153, 154, 155, 162, 285, 286, 454/284, 316, 317
See application file for complete search history.

(56) References Cited

U.S. PATENT DOCUMENTS

| | | | |
|---|---|---|---|
| 2,232,573 A * | 2/1941 | Teves ............................ | 454/286 |
| 3,366,363 A | 1/1968 | Hogan et al. | |
| 3,690,244 A * | 9/1972 | Kallel et al. .................. | 454/286 |
| 3,824,910 A * | 7/1974 | Temming ...................... | 454/154 |

(Continued)

FOREIGN PATENT DOCUMENTS

| | | |
|---|---|---|
| DE | 20 2004 013 430 U1 | 11/2004 |
| EP | 0 057 081 A2 | 8/1982 |

(Continued)

*Primary Examiner* — Steven B McAllister
*Assistant Examiner* — Brittany Towns
(74) *Attorney, Agent, or Firm* — Young & Thompson (57) ABSTRACT

The invention concerns a swivel joint ventilation flap comprising an air stream duct (10), a profiled body (18) the major part of which is at least arranged in the duct chamber, and a ring (26) co-operating with the duct and with the profiled member so that it supports the profiled body (18) in the duct while enabling the profiled body to be moved relative to the duct. Part at least of the inner surface of the chamber forms a spherical segment, the ring (26) has an outer surface forming a sphere portion of practically the same radius as the spherical segment, the ring (26) is arranged in the chamber at the outer surface of the profiled body (18). The profiled body (18) can slide relative to the ring (26). The ventilation flap is suitable for motor vehicle instrument panels.

2 Claims, 7 Drawing Sheets

(56) References Cited

U.S. PATENT DOCUMENTS

| | | | |
|---|---|---|---|
| 3,988,973 A * | 11/1976 | Honmann | 454/286 |
| 4,006,672 A | 2/1977 | Matsuyoshi et al. | |
| 4,006,673 A * | 2/1977 | Meyer et al. | 454/154 |
| 4,135,440 A * | 1/1979 | Schmidt et al. | 454/185 |
| 5,188,561 A * | 2/1993 | Nissimoff et al. | 454/256 |
| 5,399,119 A * | 3/1995 | Birk et al. | 454/76 |
| 5,722,883 A * | 3/1998 | Schwarz | 454/155 |
| 2008/0014855 A1* | 1/2008 | Leserre | 454/155 |

FOREIGN PATENT DOCUMENTS

| | | | |
|---|---|---|---|
| EP | 0 412 066 A1 | 2/1991 | |
| FR | 2710880 A1 * | 4/1995 | |
| FR | 2784624 A1 * | 4/2000 | |
| FR | 2 872 260 A | 12/2005 | |
| JP | 54 030747 A | 3/1979 | |
| JP | 62-045629 A | 2/1987 | |
| JP | 63 022543 B | 5/1988 | |
| JP | 64-045516 A | 3/1989 | |
| JP | 06159784 A * | 6/1994 | |
| JP | 07 117464 A | 5/1995 | |
| JP | 07 180900 A | 7/1995 | |
| JP | 08183327 A | 7/1996 | |
| JP | 2002-012023 A | 1/2002 | |
| JP | 2002-137628 A | 5/2002 | |
| JP | 2002-286284 A | 10/2002 | |
| JP | 2005-238920 A | 9/2005 | |

* cited by examiner

VENTILATION MEANS WITH ORIENTATION AND FLOW RATE ADJUSTMENT OBTAINED BY ROTATING A PROFILED BODY

The invention concerns ventilation means intended to guide a stream of air, for example conditioned air, while permitting adjustment of the orientation and flow rate of the stream as desired by a user.

Such ventilation means are intended especially for automotive vehicles in which an air circulation circuit feeds ventilation means which transmit an air flow having an orientation and flow rate that are selected by the user.

According to the document FR-2 872 260, which was published only after the priority dates of the present specification, ventilation means with adjustment of the orientation of an air stream are already known which comprise an air stream duct having, between an inlet and an outlet, a first portion forming a domed chamber of gradually varying cross-section, and a second portion in the form of a spherical segment. A profiled body, housed in the chamber, is connected by a rod to a ring in the form of a spherical segment complementary to the spherical segment of the second portion. The second portion and the ring form a swivel joint permitting transverse movement of the profiled body in the chamber. Thus, in a transverse section of the chamber of the ventilation means, the movement of the profiled body relative to the duct brings about a variation in the passage cross-section of the guided stream between a ring shape and a crescent shape.

The ventilation means described in this document utilise the effect known as the "Coanda effect", according to which a stream guided between surfaces exhibits a low loss of head, and therefore creates little noise, when the stream attaches itself to the surfaces. This result is obtained in these ventilation means by means of the use of surfaces with gradual curvature of the chamber of the duct and of the outside of the body which is profiled.

In ventilation means of this type, a swivel joint movement between the duct and the profiled body permits the orientation of the profiled body; thus the air stream, which circulates at the periphery of the profiled body, can be oriented on a side opposed to that towards which the profiled body is moved in the duct, while maintaining the air stream attached to the surfaces of the profiled body and of the duct.

Obtaining these advantages of a low loss of head and a low ventilation noise, however, poses a problem, since the great length of the ventilation means makes them difficult and sometimes impossible to incorporate in a motor vehicle dashboard.

The present invention concerns the solving of this problem, and its subject is the preservation of the advantages of low loss of head and reduced ventilation noise in ventilation means having a short length so that they can be incorporated in practically all motor vehicle dashboards.

This problem is solved according to the invention because the swivel joint movement permitting the movement of the body in the chamber is obtained between the chamber itself and a ring which carries the body in the chamber. Thus, a second duct portion in prolongation of the first is superfluous.

The swivel joint movement between the chamber and the ring is obtained by the co-operation, with a chamber having an inner surface in the form of a spherical segment, of a ring either in the form of a spherical segment pivoting in one piece, or in the form of two sphere sectors pivoting connectedly or separately.

The ventilation means according to the invention thus exhibit all the aforesaid advantages, owing to the combination of a pivoting or rotating movement of the profiled body with a translational movement of that body in the duct.

More precisely, the invention concerns ventilation means with adjustment of orientation and flow rate of an air stream, of the type which comprise an air stream duct having, between an inlet and an outlet defining a direction of circulation, at least one chamber with a cross-section gradually increasing then gradually decreasing in the circulation direction, a profiled body, at least the major part of which is arranged in the duct chamber, the profiled body having an outer surface which, in the circulation direction, has a cross-section gradually increasing then gradually decreasing, such that the air stream which circulates in the duct chamber about the profiled body constitutes a peripheral stream which gradually widens out then gradually narrows, and a ring co-operating with the duct and with the profiled member so that it supports the profiled body in the duct while enabling the profiled body to be moved relative to the duct; according to the invention, at least a part of the inner surface of the chamber forms a spherical segment, the ring has an outer surface forming a sphere portion of substantially the same radius as the spherical segment of the chamber, and the ring is arranged in the chamber, at the outer surface of the profiled body.

It is of advantage that the dimension of the profiled body, along a straight line intersecting perpendicularly the circulation direction, is at least equal to a quarter of the dimension of the chamber along the same straight line.

Preferably, the chamber and the profiled body are substantially generated by revolution.

In a first embodiment, the ring has an outer surface in the form of a spherical segment having a radius substantially equal to the radius of the spherical segment of the duct, the ring having at least one arm protruding towards the inside of the ring and intended to support the profiled body.

Preferably, the profiled body has at least one groove intended to co-operate with the arm of the ring so that the arm slides in a direction having at least one component in the longitudinal direction of the duct, such that the movement of the profiled body relative to the duct has, in addition to at least one degree of freedom in rotation, a degree of freedom in translation.

Preferably, the ring has at least three arms.

Preferably, the profiled body carries on the outlet side an operating device.

Preferably, the duct and the profiled body have, respectively, one a lip and the other a groove able to co-operate in a substantially sealed manner, at the location at which the profiled body is substantially in contact with the duct.

Preferably, the ventilation means include a device for holding the profiled body in position in the duct.

In a first example, the holding device includes zones of roughness co-operating with at least one protuberance resiliently returned towards the ring, the zones of roughness being formed on the ring or the inner surface of the duct and the protuberances being formed respectively on the inner surface of the duct or the ring.

In a second example, the holding device includes resilient tongues protruding at the outside of the ring and formed in one piece with the ring, the resilient tongues co-operating with the inner surface of the duct by sliding.

In a third example, the holding device includes zones of roughness formed at the inner surface of the duct or at the outer surface of the ring, and having resiliently deformable ends co-operating respectively with the outer surface of the ring or the inner surface of the duct.

Preferably, the ring bears fins which are each contained in a plane containing the central axis of symmetry of the ventilation means, the inner end of each fin being able to slide in a slot in the profiled body.

In a second embodiment which is an improvement to the first, the profiled body has a central passage intended for a central stream which is added to the peripheral stream. In this case, the operating device preferably includes a grip member carried by a grille arranged in the central passage at the outlet of the profiled body.

In this embodiment, the ventilation means take advantage of the effect of deflection of the central stream by the peripheral stream, and permit orientation not only in one plane, but also in two directions, i.e. in a whole volume. The stream obtained may be oriented substantially in all the directions comprised substantially in a hemispherical space. In this embodiment, either the profiled body is simply oriented in rotation in the duct, or it is also moved in a longitudinal direction and thus permits elaborate modulation of the interaction of the central and peripheral air streams.

In a third embodiment, the spherical segment of the duct chamber has an angle at the centre of at least 90°, and the ring comprises two sliding members, each formed of a sphere sector equipped with at least one arm co-operating with the profiled body via a cam device, each sphere sector segment having, at least in proximity to the diameter connecting its ends, an angle at the centre of at least substantially 90°, the sphere sectors of the two sliding members having a radius substantially equal to that of the sphere of the spherical segment of the chamber, and the profiled body includes an operating member which is integral therewith and intended to allow a user to adjust both the orientation of the profiled body, by connected rotation of the sphere sectors in contact with the spherical segment, and the occlusion of the outlet opening of the duct by the sliding members, by rotation of the sliding members via the cam devices, such that the movement of the profiled body relative to the duct has, in addition to at least one degree of freedom in rotation, a degree of freedom in translation.

The ventilation means permit independent adjustments on the one hand of the orientation of the air stream and on the other hand of its flow rate. It avoids the drawback of the simultaneous variation of the orientation and the flow rate provided by the known ventilation means with fins, in which parallel fins can be oriented by rotation about parallel axes, for the adjustment of the angle of the air stream with a central axis, and rotated with their support for the adjustment of the direction of the air stream about the central axis. According to the invention, the two adjustments may, however, be obtained by controlling a single operating member.

Preferably, the sliding members are scalloped at the edge adjacent to the inlet opening.

Preferably, the ventilation means include a device for holding in position by friction between the sphere sectors and the spherical segment.

In a first example, the position holding device creates a frictional force against the inner surface of the duct, which force is applied by the ends of the sphere sectors of the sliding members which have a tendency to move resiliently apart.

In a second example, the holding device includes zones of roughness formed at the inner surface of the duct or at the outer surface of the sliding members, and having resiliently deformable ends co-operating respectively with the outer surface of the sliding members or the inner surface of the duct.

Preferably, the operating member has an elongate shape transversely to the axis of the ventilation means, allowing the user not only a movement for the orientation of the outlet stream and a longitudinal movement bringing about the closure or the opening of the sliding members, but also the rotation of the assembly consisting of the sliding members and of the profiled body about a substantially longitudinal axis of the duct.

Preferably, the cam devices each include a cam groove moved in translation by the operating member, and a protuberance integral with the arm of a sliding member.

Preferably, the sliding members carry fins which are each contained in a plane containing the central axis of symmetry of the ventilation means, the inner end of each fin being able to slide in a slot in the profiled body.

Thus, according to the invention, a duct having a domed chamber contains a profiled body which can not only be oriented in any direction whatsoever, but also may be moved in a longitudinal direction and thus permits precise adjustment of the flow rate.

Figure 1:
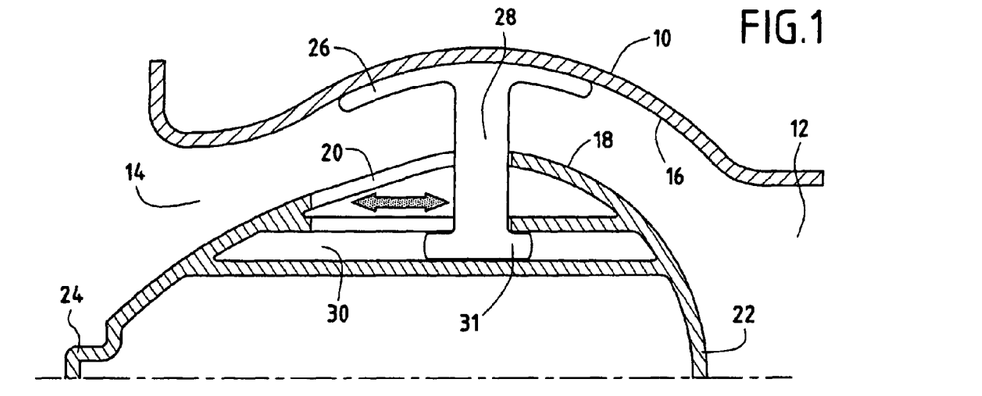
FIG. 1 is a half-section of ventilation means according to a first embodiment of the invention.

Other features and advantages of the invention will become clearer on reading the following description of several embodiments, which is given with reference to the appended drawings, in which:

FIG. 1 is a half cross-section of ventilation means according to a first embodiment of the invention.

The ventilation means include a duct 10 which forms a chamber between an inlet opening 12 and an outlet opening 14. The inner surface 16 of a portion of duct 10 is in the form of a spherical segment.

Inside the duct chamber, a profiled body 18 has longitudinal slots 20 between its rounded inlet portion 22 and an operating member 24 formed at its outlet end.

A ring 26, the outer surface of which constitutes a spherical segment of the same radius as the spherical segment of the inner surface 16 of the duct 10, can slide against the inner surface 16. The ring 26 includes at least one arm 28, preferably three, protruding towards the inside in a slot 20 of the profiled body and terminating in a groove 30 of the profiled body 18. The groove, shown as elongate in a longitudinal direction, but which may also have a different orientation, for example in a helix, constitutes an improvement to the basic device which simply comprises arms 28 integral with the profiled body 18, which does not then have the slots 20.

In the basic embodiment, the profiled body 18 can simply rotate about the centre of the swivel joint formed by the sphere segments of the duct 10 and of the ring 26.

In the improvement shown in FIG. 1, the profiled body 18 can furthermore move longitudinally by sliding of the ends of the arms 28 in the grooves 30. It thus modulates the shape of the passage of the air stream between itself and the wall of the duct, and thus the flow rate. It is thus practically possible for a portion of the profiled body 18 to be very close to the wall of the duct 10, so that the main part of the stream is concentrated substantially at a single location on the periphery. The body 18 then has a significant deflecting effect, in addition to its function of adjustment of the flow rate.

A device has been described having preferably three arms 28, but there may be any number of arms. Moreover, the end of the arm may simply pass into a slot 20 as far as a groove such as 30, or may have lateral protuberances rendering the profiled body 18 firmly connected to the ring 28, the groove then having the shape indicated in FIG. 2. Moreover, the ring may be equipped with fins, as described hereinafter with reference to FIGS. 4 and 7.

Figure 6:
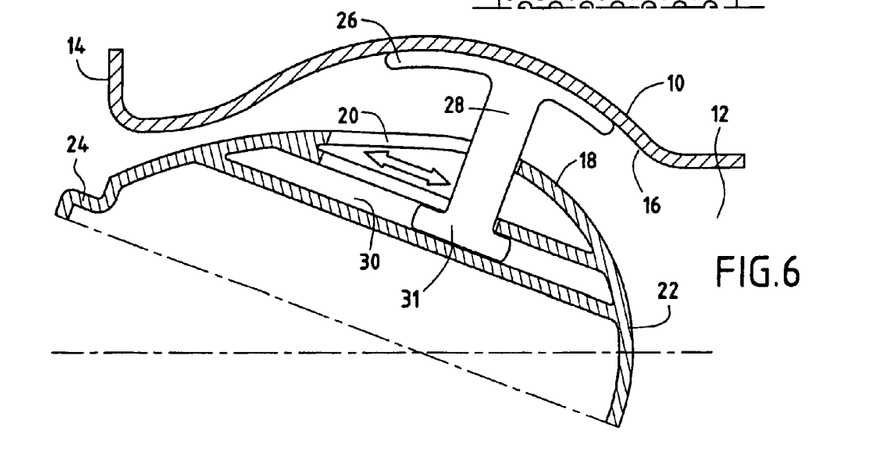
FIG. 6 is analogous to FIG. 1, but shows the profiled body and the ring after rotation relative to the duct.

FIG. 6 shows the relative arrangement of the duct 10 and the profiled body 18 when this latter, moved by the operating member 24, occupies a position in which it has rotated with the ring 26 relative to the duct 10. It will be noted that at the outlet 14 there is only a reduced passage between the body 18 and the duct 10, so that the main part of the flow of the ventilation means passes at the lower portion and is deflected upwards, that is to say, on the side towards which the operating member 24 is moved.

Figure 2:
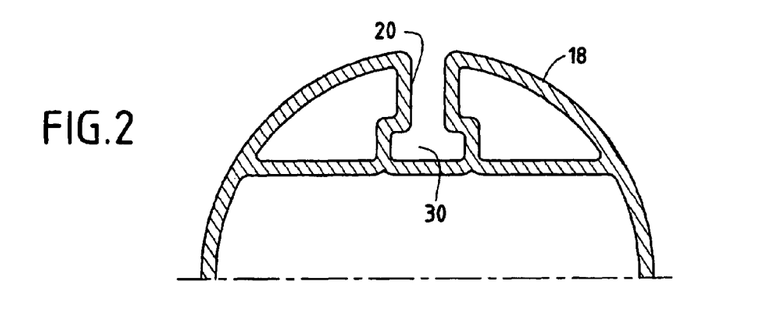
FIG. 2 is a transverse half-section of the profiled body of the ventilation means of FIG. 1.
Figure 3:
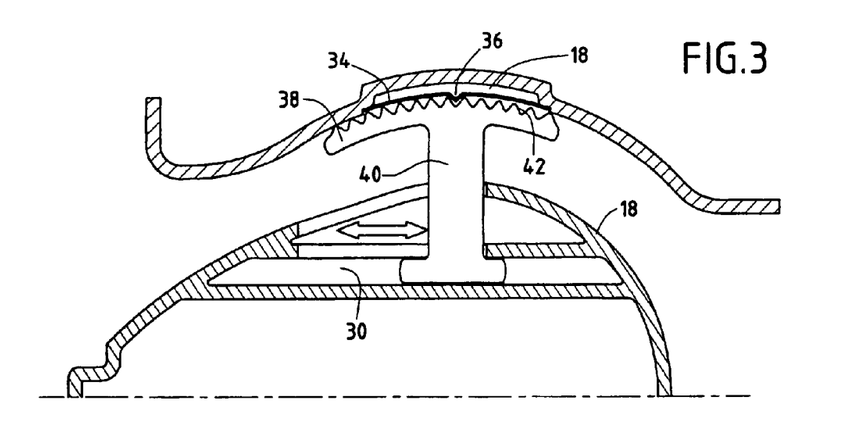
FIG. 3 is a half-section analogous to FIG. 1, representing a variant of a device for holding the profiled body in position.
Figure 4:
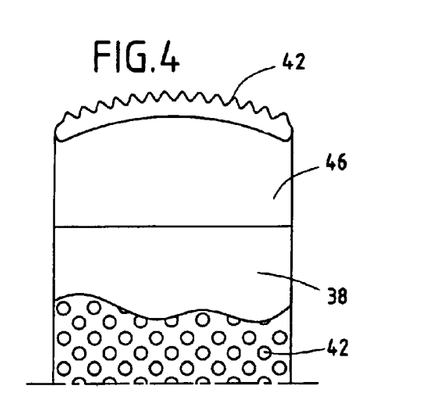
FIG. 4 is an enlarged view of a portion of the ring of the embodiment of FIG. 3.

In this embodiment of FIGS. 1 and 2, the holding of the profiled body in position with the desired orientation is effected simply by the friction of the ring 26 against the duct 10. It may be necessary to incorporate a more efficient position holding device. FIGS. 3 and 4 show such a device.

In FIGS. 3 and 4, the profiled body 18 is held by the ring on the duct by means of a mechanism for creating a position holding force which comprises a cavity 32 formed in the duct for housing a resilient member 34, for example a thin plate, having at least one protuberance 36 which can co-operate resiliently with the surface of the ring 38. The ring is connected to the profiled body 18 by arms 40. The outer surface of the ring 38 has zones of roughness 42 and, when the profiled member has been moved into the desired position, at least one protuberance 36 is held between two adjacent zones of roughness 42.

The position holding mechanism may obviously be different. For example, the ring may be discontinuous at its periphery, the discontinuities comprising any type of resilient return device permitting the creation of a force for pressing the ring against the spherical surface of the duct.

Figure 8:
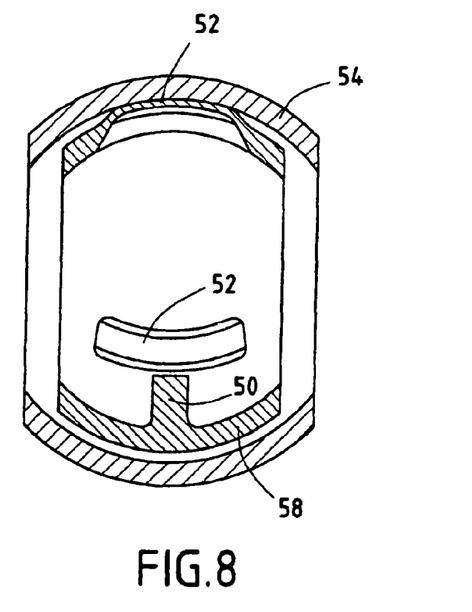
FIG. 8 is a partial section through a ring and a duct in a second variant of a device for holding the profiled body in position.
Figure 9:
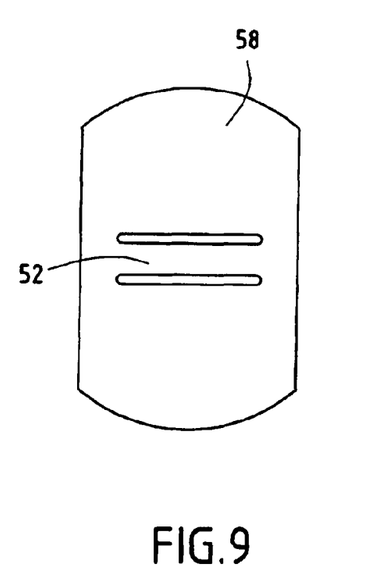
FIG. 9 is a view in elevation of the ring in the second variant of a device for holding the profiled body in position.

Thus, in the variant of FIGS. 8 and 9, the ring 58 carries resilient tongues 52 which protrude at the outside of the ring 58. They are formed in one piece with the ring 58, during the moulding of this latter with its arms 50. The outer faces of the tongues 52 are intended to slide against the inner surface of the duct 54. It is thus possible to adjust the contact force between the ring and the duct to the desired value by determination of the dimensions of the tongues 52.

Figure 10:
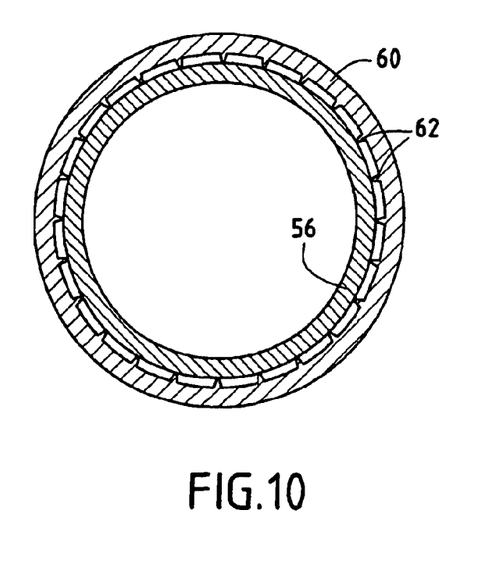
FIGS. 10 and 11 are sections through a ring and a duct in a third variant of a device for holding the profiled body in position.
Figure 11:
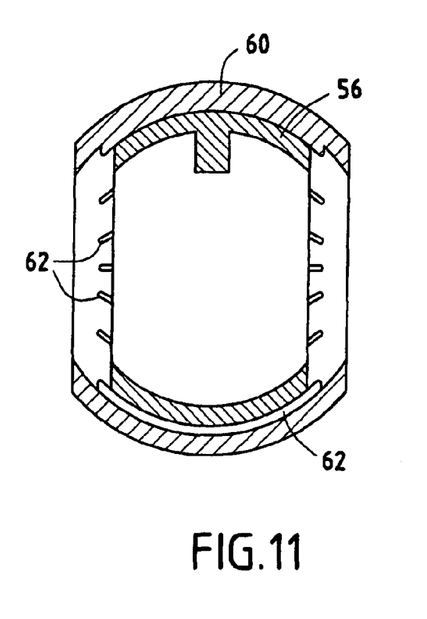

In the variant of FIGS. 10 and 11, the holding device includes zones of roughness 62, having for example a V-shaped cross-section, formed on the inner surface of the duct 60 and having resiliently deformable ends applied against the outer surface of the ring 56. Although the zones of roughness 62 have been shown in the form of lines along generating lines of the duct, they may be of any desired shape provided that they produce forces adequate for centring the profiled body in the duct. The position of the zones of roughness may be reversed, that is to say, they may be located at the outer surface of the ring, the inner surface of the duct being smooth.

Figure 7:
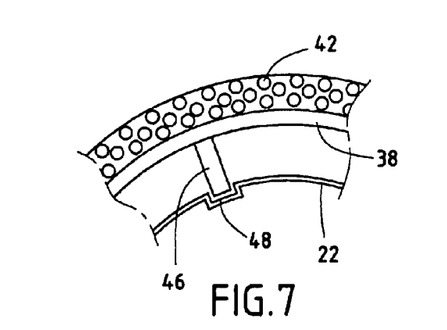
FIG. 7 is an end view of a ring portion of FIG. 4, according to a variant.

FIGS. 4 and 7 show a variant which reinforces the orientation of the flow, when the profiled body is inclined relative to the duct, for example in a position analogous to that in FIG. 6.

FIG. 7 is an end view of a portion of the ring 38 of FIGS. 3 and 4, and it will be noted that the inner face of the ring is integral with a fin 46. This latter is contained in a plane containing the central axis of symmetry of the ventilation means. The inner end of the fin 46 can slide in a slot 48 of the profiled body. Preferably, the ring carries a plurality of fins, for example six. The fins have the function of reinforcing the orientation of the flow in the longitudinal direction of the profiled body, so that, for example in the case of FIG. 6, the flow which emerges through the widest cross-section defined between the duct 10 and the profiled body is well guided at the outlet 14.

Figure 5:
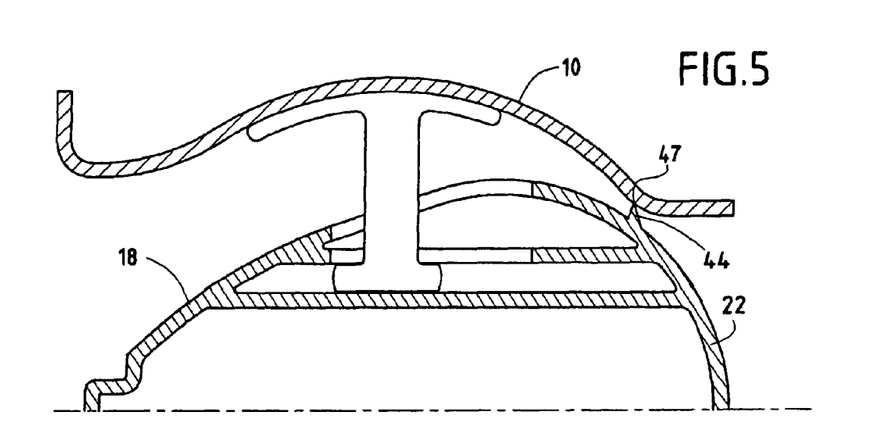
FIG. 5 is a half-section of a variant of the ventilation means of FIG. 1, equipped with a sealing lip.

As FIG. 1 suggests, the profiled body 18 may be pushed towards the inside of the duct 10 by sliding of the grooves 30 on the T-shaped ends 31 of the arms 28. It can then assume a position in which its inlet surface 22 comes into contact with the inner surface of the duct 10, around the inlet opening 12. In this position, the stream is substantially interrupted. However, when this closure does not provide the expected seal, it is possible to reinforce it by the use of a co-operating lip and groove. In the variant of FIG. 5, a lip 44 formed at the outer surface of the profiled body 18 lodges in a groove 46 of the inner surface of the duct 10 when the body 18 has been pushed into the closure position.

Thus, the invention concerns ventilation means permitting the orientation of an air stream, while permitting the adjustment of the flow rate of the air stream and, in particular, while ensuring the sealed closure, and therefore the silence, of the ventilation means.

Figure 12:
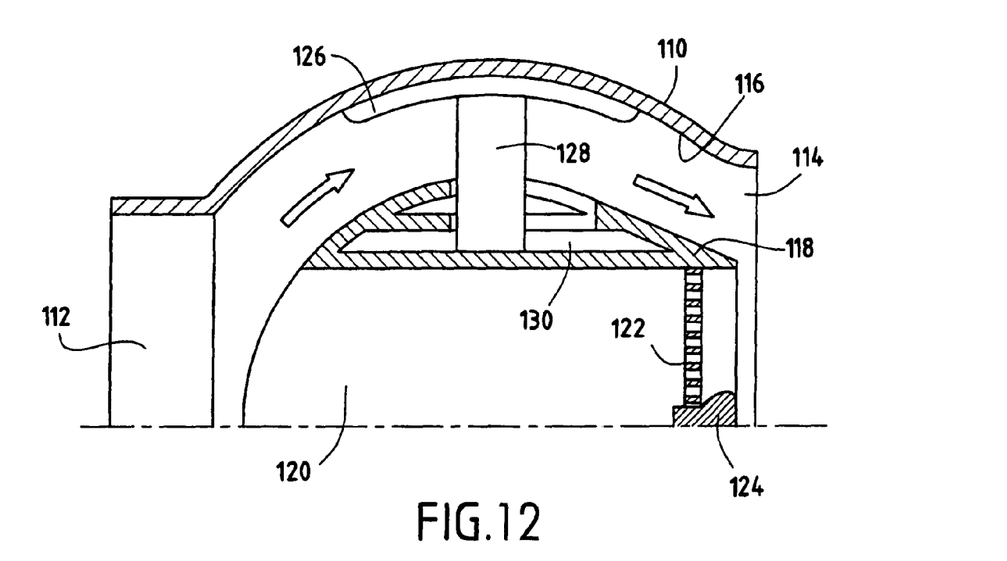
FIG. 12 is a section through ventilation means according to a second embodiment of the invention.
Figure 13:
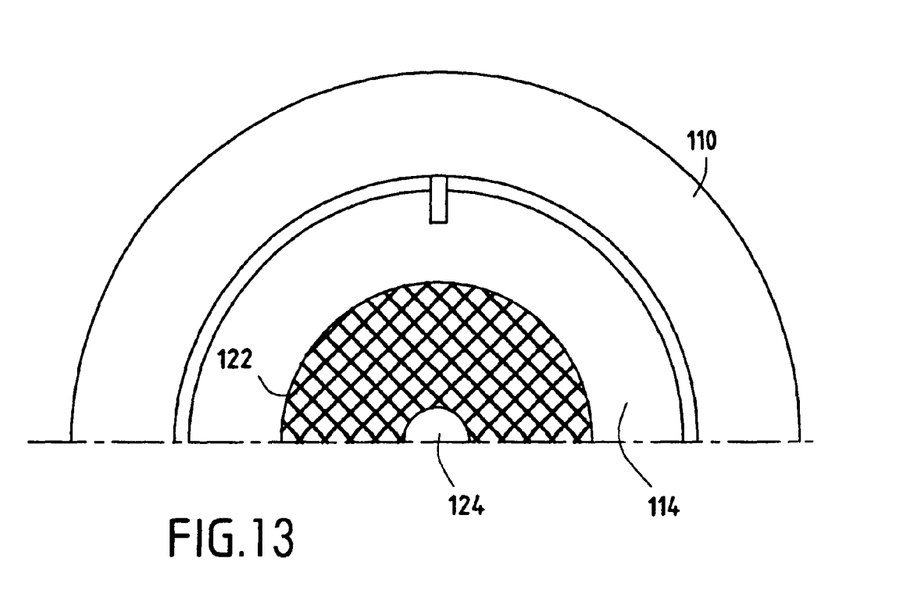
FIG. 13 is a half-view in front elevation of the ventilation means of FIG. 12.

The second embodiment of the invention will now be considered, and FIG. 12 is a transverse half-section of ventilation means according to this second embodiment.

The ventilation means include a duct 110 which forms a chamber between an inlet opening 112 and an outlet opening 114. The inner surface 16 of a portion of duct 110 is in the form of a spherical segment, corresponding to an angle at the centre of the order of 90° in the embodiment in question.

Inside the duct, a profiled body 118 defines a central passage 120, the outlet opening of which carries a grille 122 equipped at its centre with an operating member 124.

A ring 126, the outer surface of which constitutes a spherical segment of the same radius as the spherical segment of the inner surface 116 of the duct 110, can slide against this inner surface 116. The ring 126 includes at least one arm 128, preferably three, protruding towards the inside and terminating in a groove 130 of the profiled body 118. The groove, shown elongate in a longitudinal direction, but which may also have a different orientation, for example in a helix, constitutes an improvement to the device which simply comprises arms 128 integral with the profiled body 118.

Figure 16:
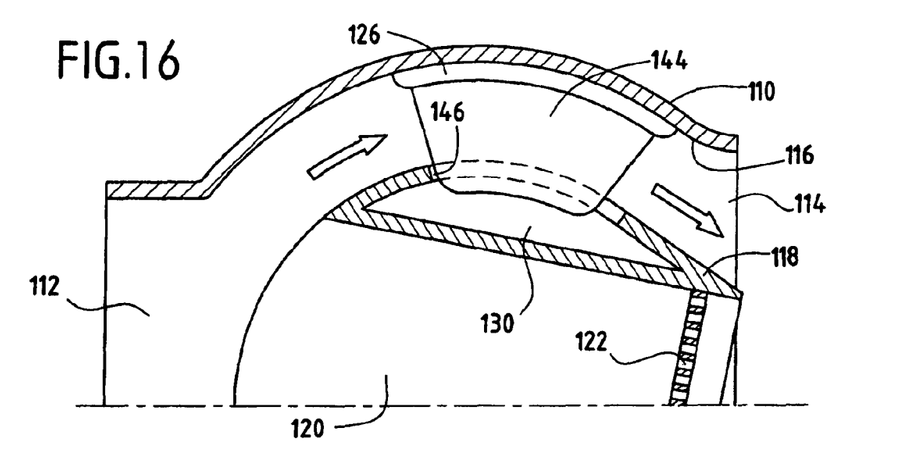
FIG. 16 is analogous to FIG. 12, but represents a variant with fins, with the profiled body inclined.

In this embodiment, the profiled body 118 can simply rotate about the centre of the swivel joint formed by the sphere segments of the duct 110 and of the ring 126, assuming a position such as that indicated in FIG. 16.

In the improvement shown in FIG. 12, the profiled body 118 can furthermore move longitudinally and thus modulate the shape of the passage of the air stream between itself and the wall of the duct. It is thus practically possible for a portion of the profiled body 118 to be very close to the wall of the duct 110, so that the main part of the peripheral stream is concentrated substantially at a single location on the periphery. It then has a significant deflecting effect on the stream which circulates in the central passage 120.

A device has been described having preferably three arms 128, but there may be any number of arms. Moreover, the end of the arm may simply pass into a groove such as 130, or may have lateral protuberances rendering the profiled body 118 firmly connected to the ring 128.

In the variant of FIG. 16, the ring 126 carries fins 144 which are each contained in a plane containing the central axis of symmetry of the ventilation means. The inner end of each fin 144 can slide in a slot 146 in the profiled body 118. The fins are arranged between the arms 140. The ventilation means may for example comprise two arms and four fins, or three arms and three or six fins, other numbers obviously being possible.

The function of the fins is to regularise the flow of air so that it follows the generating lines of the profiled body 118. In this way, the air flow formed between the duct 110 and the profiled body 118 is guided optimally and provides optimal orientation of the air flow at the outlet in the direction in which the profiled body is inclined by the operating member 124.

Figure 14:
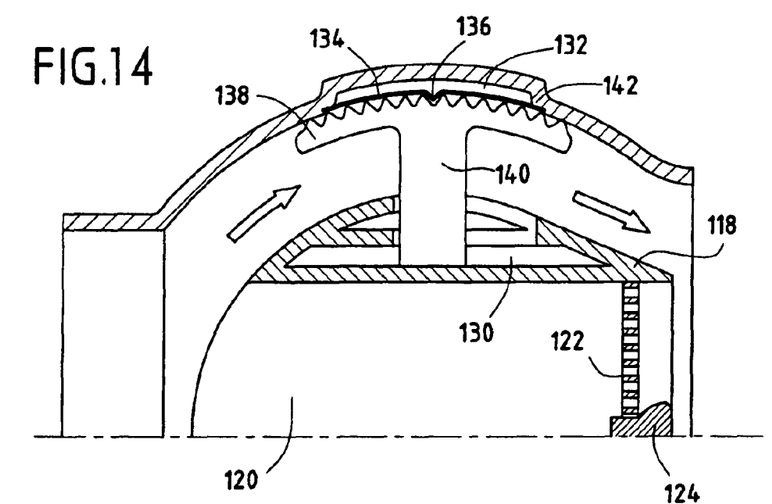
FIG. 14 is a section analogous to FIG. 12, showing a variant of a device for holding the profiled body in position.
Figure 15:
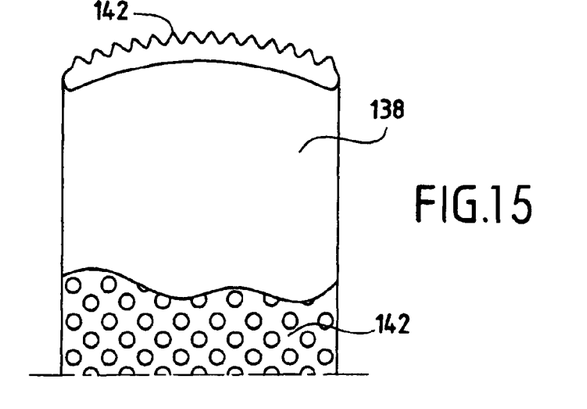
FIG. 15 is an enlarged view of a portion of the ring of the embodiment of FIG. 14.

In the embodiment of FIG. 12, the holding of the profiled body in position with the desired orientation is ensured simply by the friction of the ring 126 against the duct 110. It may be necessary to incorporate a more efficient position holding device. FIGS. 14 and 15 show such a device. The device of FIGS. 14 and 15 is analogous to that which has been described for the ventilation means of the first embodiment, and the analogous elements bear the same numerical references, preceded by a "1" for the hundreds figure.

This position holding mechanism may obviously be different. For example, the ring may be discontinuous at its periphery, the discontinuities comprising any type of resilient return device permitting the creation of a force for pressing the ring against the spherical surface of the duct.

The third embodiment of the invention will now be considered.

Figure 17:
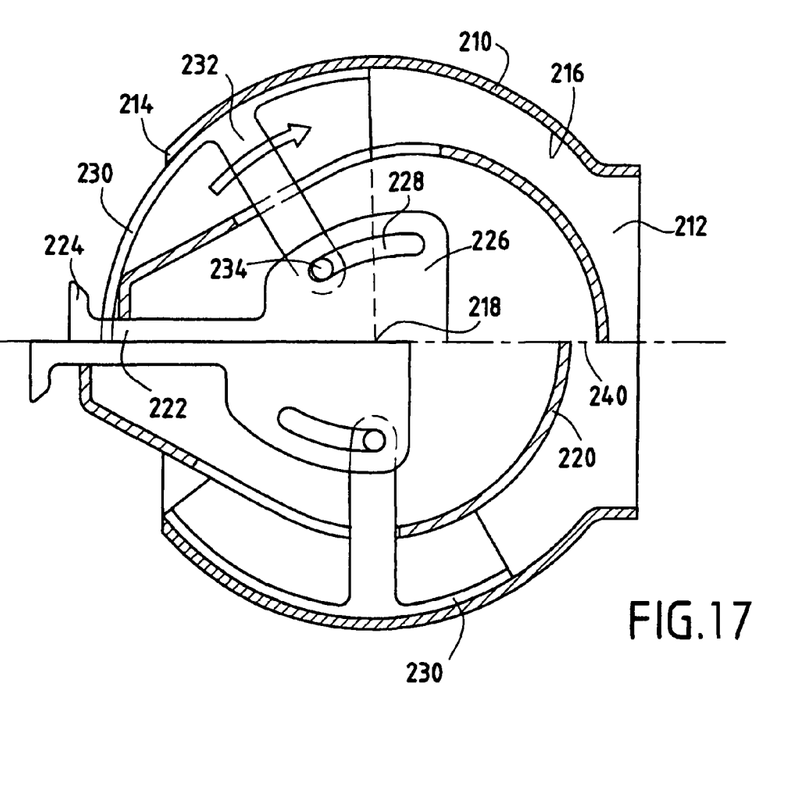
FIG. 17 is a diagrammatic section, the lower part of which shows a half-section of ventilation means according to a third embodiment of the invention in the opening position, and the upper part shows it in the closure position.

In FIG. 17, the reference 210 designates a duct which forms a chamber between an inlet end 212 and an outlet end 214. Between the inlet and the outlet, the chamber defines an inner surface 216, one portion of which is in the form of a spherical segment. The angle at the centre (determined at the centre 218) of the spherical segment of the inner surface 216 is at least 90°.

A profiled body 220 is mounted inside the duct 210. It has an arm 222 which protrudes therefrom on the outlet opening side. The arm 222, on the outlet side, has an operating member 224 and, inside the profiled body 220, a cam 226 having a guide groove 228.

Two sliding members 230, each having the shape of a sphere sector having an angle substantially of 90°, are mounted inside the duct 210 in contact with this latter. Each sliding member 230 has at least one arm 232 which bears at its inner end a cam protuberance 234 intended to move in the cam groove 228.

In the position shown in the upper portion of FIG. 17, the outlet opening of the duct 210 is closed by the sliding members 230 which come into mutual contact substantially at the longitudinal axis of the duct 210, on either side of the arm 222. Starting from this position, when the user pulls the operating member 224, the cam 226, via its groove 228, causes the sliding member 230 to rotate towards the inside of the duct, towards the opening position indicated in the lower portion of FIG. 17. In this opening position, the inlet and outlet openings 212 and 214 are largely freed.

It has been indicated that the user had the capability of opening and closing the outlet opening via the sliding members 230 which form a shutter. However, in all the positions, especially the intermediate positions, the user also has the capability of moving the operating member 224 parallel to the outlet opening 214 of the duct 210, thus modifying the orientation of the air stream discharged.

Figure 19:
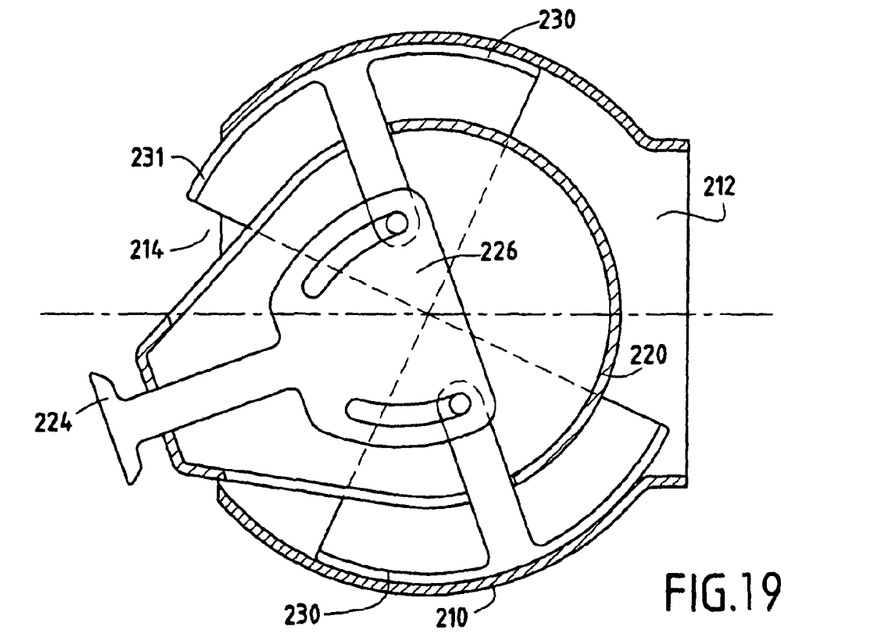
FIG. 19 is a diagrammatic section of the ventilation means of FIG. 17, when the profiled body has rotated relative to the duct.

This arrangement is shown in FIG. 19, in which the profiled body 220 has rotated through approximately 25° relative to the duct 210. It will be noted that in the upper portion of FIG. 19, a portion 231 of the sliding member 230 protrudes at the outlet 214 of the duct 210 and thus participates in the deflection of the air flow in an upward direction.

Moreover, in the example shown, when the operating member 224 is a transversely elongate member, the user may rotate it about the longitudinal axis of the duct and thus cause the members 230 to slide inside the spherical duct, connectedly about the longitudinal axis of the duct.

Although the sliding members have been shown in the form of sphere sectors of at least 90°, this property is necessary over only part of the sectors, provided that the sectors still cover a circle passing through the centre of rotation. For example, the edge of the sliding members 230 may be scalloped on the same side as the inlet opening 212, provided that the profiled body is still held by the two sliding members 230 inside the spherical segment of the duct 210.

In particular, it is of advantage for a frictional force to be applied substantially between the sliding members and the inner surface of the duct 210 by the adjacent parts of the ends of the sphere sectors, since it is easy to adjust the resilience of these sliding members at the time of their manufacture.

Figure 20:
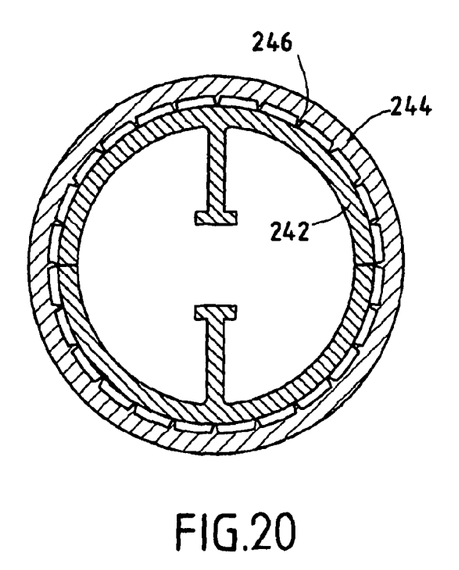
FIGS. 20 and 21 are respectively a cross-section and a longitudinal section through a duct and sliding members in a variant of the invention.
Figure 21:
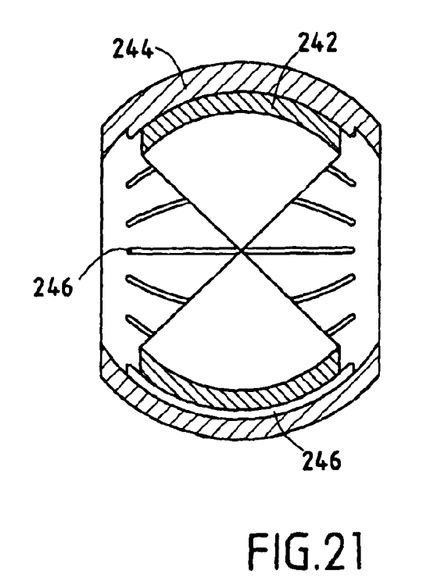

However, as indicated in FIGS. 20 and 21, in a variant, the holding device includes zones of roughness 246 formed at the inner surface of the duct 244 and having resiliently deformable ends co-operating with the outer surface of the sliding members 242. The arrangement may of course be reversed, with the zones of roughness being formed on the sliding members and being applied against the inner surface of the duct.

Although the zones of roughness 246 have been shown in the form of lines along generating lines of the duct, they may be of any desired shape, provided that they produce adequate forces for centering the profiled body in the duct.

Figure 18:
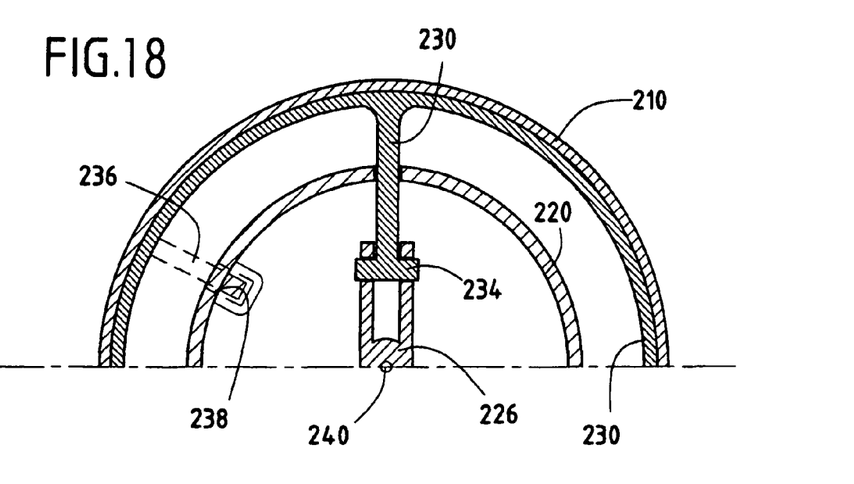
FIG. 18 is a section through a transverse plane indicating the relative arrangement of the different elements of the ventilation means of FIG. 17.

Dashed lines have been used to indicate in FIG. 18 a fin 236, integral with the sliding member 230, and which is contained in a plane containing the central axis 240 of symmetry of the ventilation means. The inner end of the fin 236 can slide in a slot 238 in the profiled body 220. The fins advantageously have a length which corresponds to an angle of at least 60° at the centre of the ventilation means. The sliding members 230 each carry three fins 236. Experiments have shown that the fins increased the directivity of the air flow formed by the ventilation means, when the profiled body 220 is moved by means of the operating member 224.

All the elements of the ventilation means according to the invention can be simply formed, especially by means of injection-moulding of plastics material, and the mechanisms used are robust and inexpensive.

The ventilation means according to the invention are very efficient because their operation by the user is very simple and intuitive, the user closing the ventilation means simply by pushing, and adjusting the direction by movement of the operating member on the side towards which he wishes to orient the stream.

In all the embodiments, the air stream is guided between gradually curved surfaces of the body which is profiled and of the chamber which opens out through the outlet of the ventilation means. The stream attaches itself to these surfaces, by the effect known as the "Coanda effect", such that it exhibits only a low loss of head and creates little noise. Moreover, the orientation adjustment and the flow rate adjustment are effected independently with a single operating member.

The invention claimed is:

1. Ventilation means for adjustment of orientation and flow rate of an air stream, comprising:
    a duct for the air stream having, between an inlet and an outlet defining a circulation direction, at least one duct chamber with a cross-section gradually increasing then gradually decreasing in the circulation direction;
    a profiled body, at least the greater part of which is arranged in the duct chamber, the profiled body having an outer surface spaced from an interior surface of the duct chamber and which, in the circulation direction, has a gradually increasing then gradually decreasing cross-section, wherein the air stream which circulates in the duct chamber about the profiled body is guided between the outer surface of the profiled body and the interior surface of the duct chamber and gradually widens then gradually narrows; and
    a ring that supports the profiled body in the duct chamber spaced from the interior surface of the duct chamber while enabling the profiled body to be moved relative to the duct chamber,
    wherein at least a part of the inner surface of the duct chamber forms a spherical segment, the ring has an outer surface forming a sphere portion of substantially the same radius as the spherical segment of the chamber, and the ring is arranged in the duct chamber at the outer surface of the profiled body,
    wherein the ring has at least one arm protruding towards the inside of the ring and supporting the profiled body, and
    wherein the profiled body has at least one groove co-operating with the arm of the ring in such a way that the arm slides in a direction having at least one component in the longitudinal direction of the duct, such that the movement of the profiled body relative to the duct has, in addition to at least one degree of freedom in rotation, a degree of freedom in translation.

2. Ventilation means for adjustment of orientation and flow rate of an air stream, comprising:
    a duct for the air stream having, between an inlet and an outlet defining a circulation direction, at least one duct chamber with a cross-section gradually increasing then gradually decreasing in the circulation direction;
    a profiled body, at least the greater part of which is arranged in the duct chamber, the profiled body having an outer surface spaced from an interior surface of the duct chamber and which, in the circulation direction, has a gradually increasing then gradually decreasing cross-section, wherein the air stream which circulates in the duct chamber about the profiled body is guided between the outer surface of the profiled body and the interior surface of the duct chamber and gradually widens then gradually narrows; and
    a ring that supports the profiled body in the duct chamber spaced from the interior surface of the duct chamber while enabling the profiled body to be moved relative to the duct chamber,
    wherein at least a part of the inner surface of the duct chamber forms a spherical segment, the ring has an outer surface forming a sphere portion of substantially the same radius as the spherical segment of the chamber, and the ring is arranged in the duct chamber at the outer surface of the profiled body, and
    wherein;
        the spherical segment of the duct chamber has an angle at the center of at least 90°,
        the ring comprises two sliding members, each formed of a sphere sector equipped with at least one arm co-operating with the profiled body via a cam device, each sphere sector having, at least in proximity to the diameter connecting its ends, an angle at the center at least substantially of 90°, the sphere sectors of the two sliding members having a radius substantially equal to that of the sphere of the spherical segment of the chamber, and
        the profiled body includes an operating member which is integral therewith and intended to allow a user to adjust both the orientation of the profiled body, by connected rotation of the sphere sectors in contact with the spherical segment, and the occlusion of the outlet opening of the duct by the sliding members, by rotation of the sliding members via the cam devices, such that the movement of the profiled body relative to the duct has, in addition to at least one degree of freedom in rotation, a degree of freedom in translation, and
    wherein the cam devices each include a cam groove moved in translation by the operating member, and a protuberance integral with the arm of a sliding member.

* * * * *